US010574922B2

(12) United States Patent
Gurindagunta et al.

(10) Patent No.: US 10,574,922 B2
(45) Date of Patent: Feb. 25, 2020

(54) IMAGING SYSTEMS WITH BOOSTED CONTROL SIGNALS

(71) Applicant: SEMICONDUCTOR COMPONENTS INDUSTRIES, LLC, Phoenix, AZ (US)

(72) Inventors: Sundaraiah Gurindagunta, Vijayawada (IN); Bharat Balar, Bengaluru (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 142 days.

(21) Appl. No.: 15/918,067

(22) Filed: Mar. 12, 2018

(65) Prior Publication Data

US 2019/0281243 A1 Sep. 12, 2019

(51) Int. Cl.
| H04N 5/378 | (2011.01) |
| G05F 1/59 | (2006.01) |
| H04N 5/369 | (2011.01) |
| H04N 5/376 | (2011.01) |

(52) U.S. Cl.
CPC .......... *H04N 5/378* (2013.01); *G05F 1/59* (2013.01); *H04N 5/3698* (2013.01); *H04N 5/376* (2013.01)

(58) Field of Classification Search
CPC ...... H04N 5/378; H04N 5/3698; H04N 5/376; G05F 1/59; H02M 3/07
USPC ...................................................... 250/208.1
See application file for complete search history.

(56) References Cited

U.S. PATENT DOCUMENTS

| 5,692,025 A * | 11/1997 | Sato ................. | H04N 5/335 377/58 |
| 8,106,703 B2 * | 1/2012 | Nagai ................ | H02M 3/073 327/536 |
| 8,848,078 B2 * | 9/2014 | Okano ............... | H02M 3/07 348/300 |
| 2016/0286145 A1 | 9/2016 | Demonte et al. | |

OTHER PUBLICATIONS

Kester et al., "Switched Capacitor Voltage Converters"; Section 4 within Practical Design Techniques for Power and Thermal Management, Edited by Walt Kester, Analog Devices, 1998, ISBN-0-916550-19-2.
Bindra, "Generating High DC Output Voltage from Low Input Supply"; Apr. 16, 2013, Electronic Products, <https://www.digikey.com/en/articles/techzone/2013/apr/generating-high-dc-output-voltage-from-low-input-supply>.

* cited by examiner

*Primary Examiner* — Seung C Sohn
(74) *Attorney, Agent, or Firm* — Treyz Law Group, P.C.; Joseph F. Guihan

(57) ABSTRACT

An image sensor may include an array of imaging pixels and row control circuitry that provides control signals to the array of imaging pixels. In order to enable the row control circuitry to provide control signals to the array of imaging pixels that have a voltage greater than the power supply voltage, the row control circuitry may include voltage booster circuitry. The voltage booster circuitry may include two amplifiers and may be operable in three different modes. In the first mode, only the second amplifier may be enabled and the output voltage may be between 0V and 2.0V. In the second mode, both the first and second amplifiers may be enabled and the output voltage may be between 2.0V and 2.8V. In the third mode, only the first amplifier may be enabled and the output voltage may be between 2.8V and 4.0V.

15 Claims, 6 Drawing Sheets

IMAGING SYSTEMS WITH BOOSTED CONTROL SIGNALS

BACKGROUND

This relates generally to image sensors, and more specifically, to image sensors with control signals.

Image sensors are commonly used in electronic devices such as cellular telephones, cameras, and computers to capture images. In a typical arrangement, an electronic device with an image sensor is provided with an array of image sensor pixels arranged in pixel rows and columns. Column sensing circuitry is typically coupled to each pixel column for reading out image signals from the image pixels. Row control circuitry is typically coupled to each pixel row for controlling operation of the image pixels. However, conventional row control circuitry may lack the ability to provide control signals with the desired voltages.

It would therefore be desirable to be able to provide imaging systems with boosted control signals.

DETAILED DESCRIPTION

Embodiments of the present invention relate to image sensors, and more particularly to the booster circuitry within image sensors. It will be recognized by one skilled in the art that the present exemplary embodiments may be practiced without some or all of these specific details. In other instances, well-known operations have not been described in detail in order not to unnecessarily obscure the present embodiments.

Figure 1:
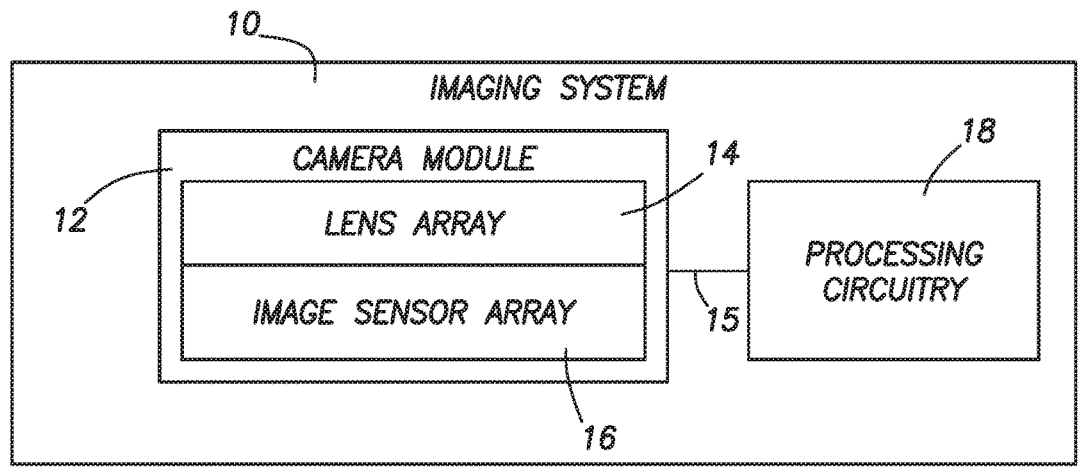
FIG. 1 is a diagram of an illustrative electronic device in accordance with an embodiment of the present invention.

FIG. 1 is a diagram of an illustrative electronic device in accordance with an embodiment of the present invention. As shown in FIG. 1, imaging system 10 may be a portable imaging system such as a camera, automotive imaging system, cellular telephone, video camera, video surveillance system, or any other desired imaging device that captures digital image data. System 10 may include a camera module 12 that is used to convert incoming light into digital image data. Camera module 12 may include an array of lenses 14 and a corresponding image sensor array 16. Lens array 14 and image sensor array 16 may be mounted in a common package and may provide image data to processing circuitry 18. Image sensor array 16 may include one or more image sensors and lens array 14 may include one or more corresponding lenses.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensor array 16 or an integrated circuit within module 12 that is associated with image sensor array 16). Image data that has been captured and processed by camera module 12 may, if desired, be further processed and stored using processing circuitry 18. Processed image data may, if desired, be provided to external equipment (e.g., a computer or other device) using wired and/or wireless communications paths coupled to processing circuitry 18.

Image sensor array 16 may contain an array of individual image sensors configured to receive light of a given color by providing each image sensor with a color filter. The color filters that are used for image sensor pixel arrays in the image sensors may, for example, be red filters, blue filters, and green filters. Each filter may cover an image sensor pixel of a respective image sensor pixel array. Other filters such as white color filters, dual-band IR cutoff filters (e.g., filters that allow visible light and a range of infrared light), etc. may also be used.

Figure 2:
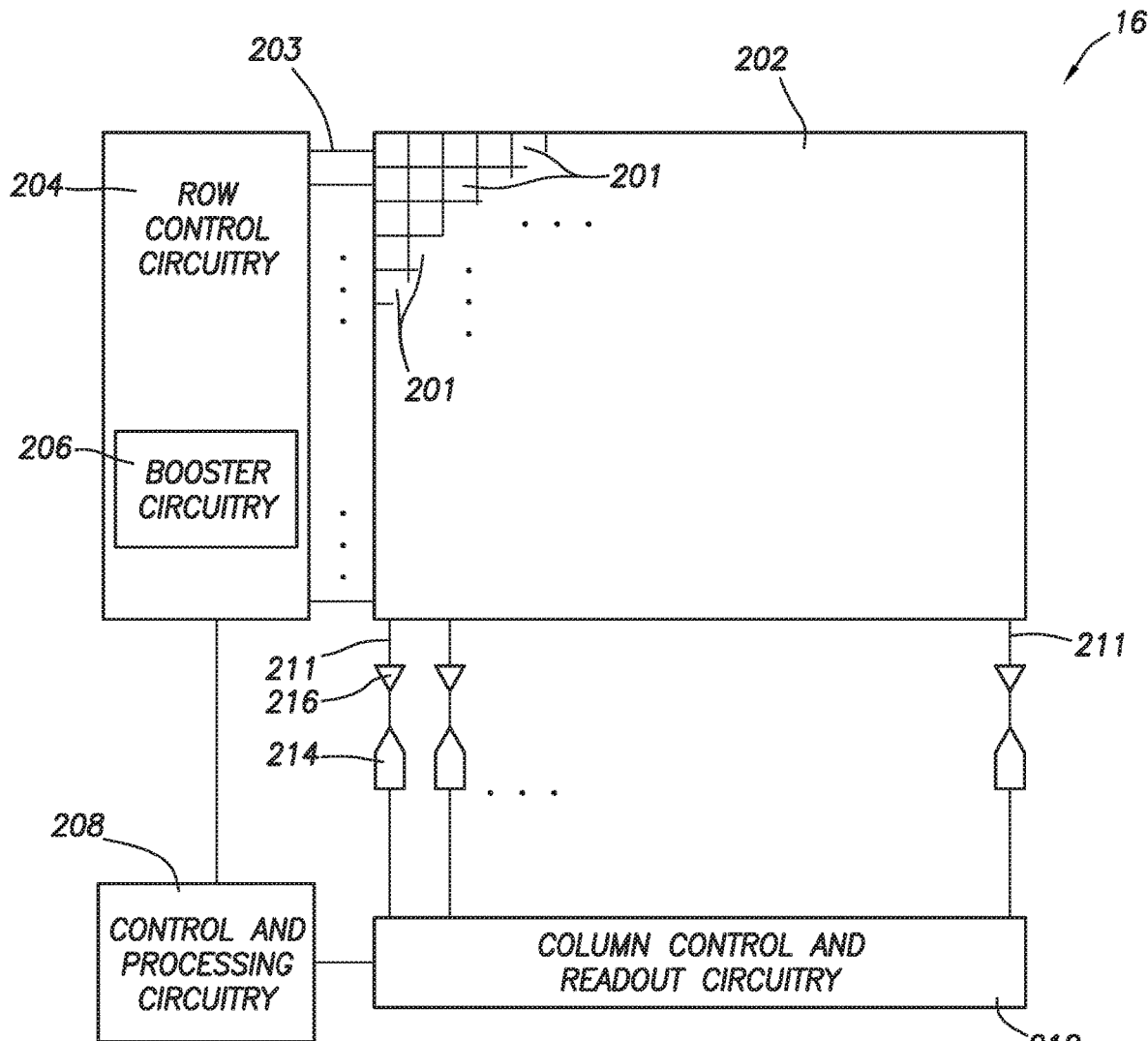
FIG. 2 is a diagram of an illustrative image pixel array in an image sensor that is controlled by row control circuitry having voltage booster control circuitry in accordance with an embodiment of the present invention.

FIG. 2 is a diagram of an illustrative image pixel array in an image sensor having row control circuitry with voltage boosting capabilities. The term "boost" and its derivatives may sometimes be used herein to indicate a voltage or a generation of a voltage which is lower than the ground reference or higher than the operating voltage supply. Boosting circuitry may be capable of producing a voltage that is higher than the operating voltage supply, as an example. In some examples, boosting circuitry may be capable of producing voltages within a range that includes voltages greater than the power supply voltage and lower than the power supply voltage (e.g., 0V-4.0V). Row control circuitry with voltage boosting capabilities is shown in FIG. 2. As shown in FIG. 2, the image sensor (e.g., image sensor 16 of FIG. 1) may include pixel array 202 having multiple pixels 201 (sometimes referred to herein as image pixels 201, imaging pixels 201, or image sensor pixels 201) and row control circuitry 204 that is coupled to image pixel array 202. Row control circuitry 204 may provide pixel control signals (e.g., row select signals, pixel reset signals, charge transfer signals, etc.) to pixels 201 over corresponding row control lines 203 to control the capture and read out of images using image sensor pixels in array 202.

Row control circuitry 204 may include voltage booster circuitry 206 (sometimes referred to herein as voltage boosting circuitry 206, boosting circuitry 206, or booster circuitry 206) for providing pixel control signals generated at control circuitry 204 with a boosted voltage magnitude. Image sensor 16 may also include column control and readout circuitry 212 and control and processing circuitry 208 that is coupled to row control circuitry 204 and column circuitry 212. Column control circuitry 212 may be coupled to array 202 via multiple column lines 211 (e.g., each column of pixels 201 in array 202). A corresponding analog-to-digital converter (ADC) 214 and column amplifier 216 may be interposed on each column line 211 for amplifying analog signals captured by array 202 and converting the captured analog signals to corresponding digital pixel data. Column control and readout circuitry 212 may be coupled to external hardware such as processing circuitry. Column control and readout circuitry 212 may perform column readout based on signals received from control and processing circuitry 208. Column control and readout circuitry 212 may include column ADC circuits 214 and column amplifiers 216.

In practice, it may sometimes be desirable to provide pixel control signals to array 202 with a boosted voltage magnitude. If desired, booster circuitry 206 may provide signals (e.g., pixel control signals) generated at row control circuitry 204 with a desired voltage boost to generate corresponding boosted signals (e.g., boosted row control signals such as boosted charge transfer signals, boosted row select signals, boosted reset signals, etc.). For example, a system may have a supply voltage of 2.8V that can then be boosted to up to 4.0V in order to have a greater voltage magnitude than the supply voltage. The booster circuitry may also be capable of outputting control signals with a voltage magnitude less than the supply voltage. For example, for a supply voltage ($V_{AAPIX}$) of 2.8V, the booster circuitry may output control signals between 0V and 4.0V.

The signals from booster circuitry 206 (sometimes referred to herein as booster signals) may be provided to control circuitry for each row of image pixel array 202. It may sometimes be useful for signals generated by the control circuitry to have a greater magnitude than the supply voltage (e.g., because it increases the dynamic range of the pixel). By increasing the dynamic range of the pixel, image quality can be increased in certain conditions such as when an image is captured in a low light environment. Other row signals, such as a charge transfer signal (that is provided to a transfer transistor) or gain select signal (that is provided to a gain select transistor coupled to a corresponding dual conversion gain capacitor), may be output by the booster circuitry at a level between ground and the power supply voltage (e.g., between 0V and 2.8V).

Amplifier 216 may be configured to receive analog signals (e.g., analog reset or image level signals) from pixel array 202 and to amplify the analog signals. The analog signals may include data from a single column of pixels or from multiple columns of pixels, depending on the application. ADC 214 may receive amplified analog signals from amplifier 216 and may perform analog-to-digital conversion operations on the analog signals before to generate digital data. The digital data may be transmitted to column control and readout circuitry 212 for processing and readout.

Figure 3:
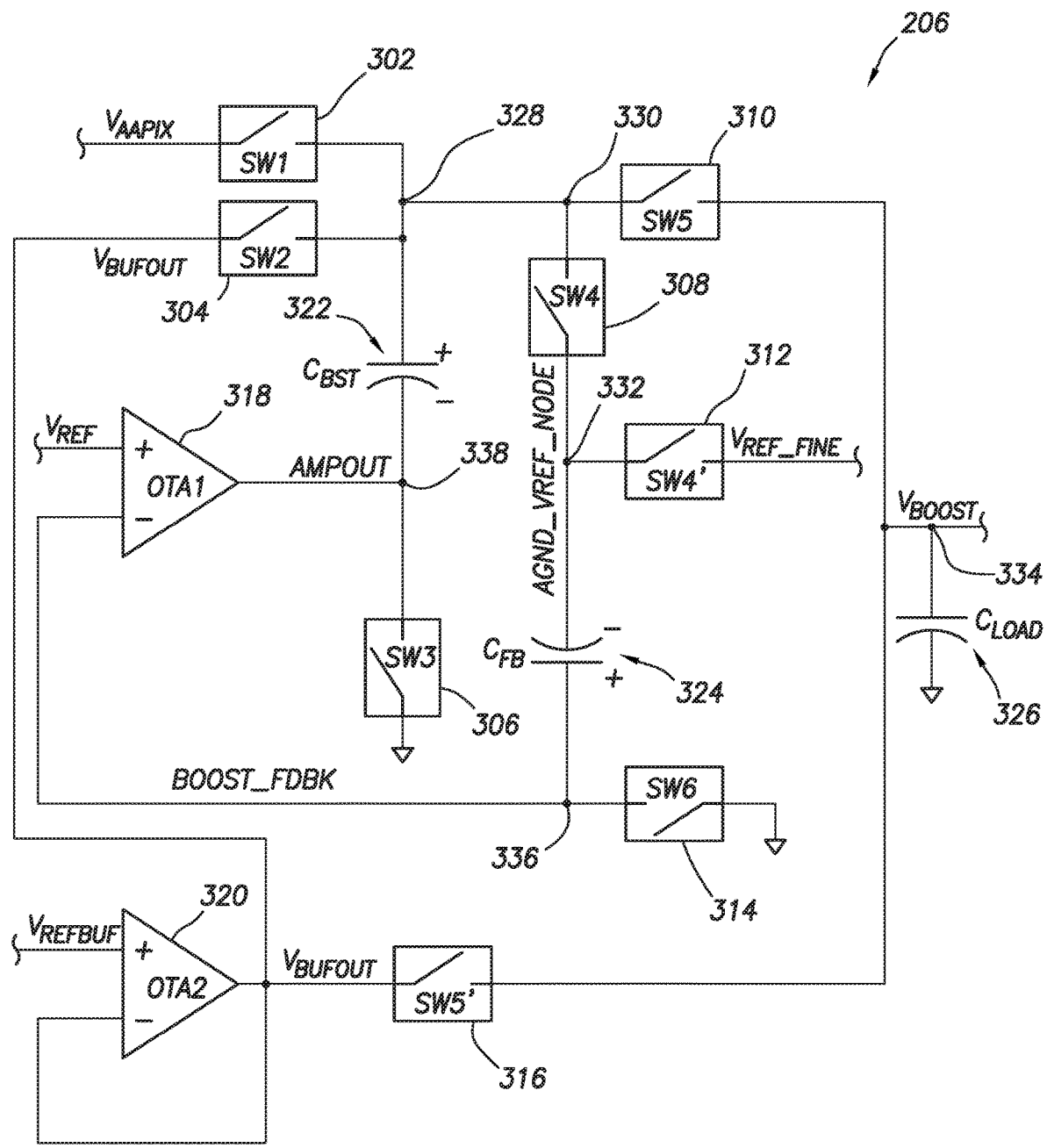
FIG. 3 is a circuit diagram of illustrative booster circuitry of the type shown in FIG. 2 in accordance with an embodiment of the present invention.

Booster circuitry 206 that may be included in image sensor 16 is shown in FIG. 3. As shown in FIG. 3, booster circuitry 206 includes a first switch 302 (SW1) that is coupled between a power supply voltage ($V_{AAPIX}$) and a node 328. Node 328 is coupled to switch 310 (SW5) and to capacitor 322 ($C_{BST}$). Switch 308 (SW4) is coupled between switch 310 (through node 330) and capacitor 324 ($C_{FB}$) (through node 332). Switch 312 (SW4') is coupled between a reference voltage ($V_{REF\_FINE}$) and node 332. Switch 310 is coupled between node 330 and capacitor 326 ($C_{LOAD}$) through node 334. Switch 314 (SW6) is coupled between ground and node 336. Node 336 is coupled to capacitor 324 and to an input of amplifier 318 (e.g., an operational transconductance amplifier). Amplifier 318 (OTA1) has first and second inputs. The first input of amplifier 318 may be coupled to a reference voltage ($V_{REF}$) whereas the second input of amplifier 318 may be coupled to node 336 (BOOST_FDBK). The output of amplifier 318 (AMPOUT) is coupled to a node 338 that is coupled between capacitor 322 and switch 306. Switch 306 (SW3) is coupled between node 338 and ground.

Switch 304 (SW2) may be coupled to node 328 and capacitor 322. Switch 304 may also be coupled to the output ($V_{BUFOUT}$) of amplifier 320 (e.g., an operational transconductance amplifier). Amplifier 320 (OTA2) has first and second inputs. The first input of amplifier 320 may be coupled to a reference voltage ($V_{REFBUF}$) whereas the second input of amplifier 320 may be coupled to the output ($V_{BUFOUT}$) of the amplifier. Switch 316 (SW5') may be coupled between the output of amplifier 320 and capacitor 326 ($C_{LOAD}$).

Each switch may be optionally opened (e.g., turned off, thereby disconnecting the components between which the switch is positioned) or closed (e.g., turned on, thereby connecting the components between which the switch is positioned). Although not explicitly labeled in FIG. 3, each switch may have respective first and second terminals that are optionally connected or disconnected. Control of some of the switches in FIG. 3 may be correlated. For example, exactly one of switch 310 (SW5) and switch 316 (SW5') may be closed at a given time. In other words, if switch 310 is closed, switch 316 is open, and if switch 310 is open, switch 316 is closed. Similarly, exactly one of switch 308 (SW4) and switch 312 (SW4') may be closed at a given time. In other words, if switch 308 is closed, switch 312 is open, and if switch 308 is open, switch 312 is closed. Switches 306 and 314 may be in the same position. For example, if switch 306 is open, switch 314 is open, and if switch 306 is closed, switch 314 is closed.

During operation, booster circuitry 206 may be used to provide a desired output voltage ($V_{BOOST}$). The output voltage $V_{BOOST}$ may be provided to a switching array that provides control signals to imaging pixels in the image sensor, as an example. It may be desirable for booster circuitry to be able to output a voltage that is controllable within a range between 0V (e.g., ground voltage) and 4.0V (e.g., a voltage greater than the power supply voltage). Booster circuitry 206 may have three modes of operation to enable output of a voltage between 0V and 4.0V. In the first mode of operation, only amplifier 320 (OTA2) is enabled and output voltage $V_{BOOST}$ is between 0V and 2.0V. In the second mode of operation, amplifiers 318 (OTA1) and 320 (OTA2) are enabled and output voltage $V_{BOOST}$ is between 2.0V and 2.8V. In the third mode of operation, only amplifier 318 (OTA1) is enabled and output voltage $V_{BOOST}$ is between 2.8V and 4.0V. Therefore, booster circuitry 206 may use the three modes of operation to provide any desired output voltage between 0V and 4.0V.

First, the operation of the booster circuitry in the first mode of operation will be described. During the first mode of operation, amplifier 320 (OTA2) may be enabled whereas amplifier 318 (OTA1) may be disabled. In the first mode of operation, switch 316 (SW5') is connected and switch 310 (SW5) is disconnected. The states of the other switches (302, 304, 306, 308, 312, and 314) may not affect the operation of the booster circuitry in the first mode (meaning they can be either open or closed). However, it may be desirable to turn off switch 304 (SW2) to avoid an unnecessary load on $V_{BUFOUT}$. A reference voltage ($V_{REFBUF}$) is provided to the first input of amplifier 320. The output ($V_{BUFOUT}$) of amplifier 320 will equal the input voltage $V_{REFBUF}$. Because switch 316 is closed, $V_{BOOST}$ (the output voltage) will equal $V_{BUFOUT}$. Therefore, $V_{BOOST}=V_{REFBUF}$ and $V_{REFBUF}$ can be controlled between 0V and 2.0V such that the output voltage $V_{BOOST}$ has a desired value between 0V and 2.0V.

Next, consider operation of the booster circuitry in the third mode of operation, in which amplifier 318 (OTA1) is enabled and amplifier 320 (OTA2) is disabled. In the third mode of operation, a pre-charge phase may first be completed. During the pre-charge phase, switches 302, 306, 308, 310, and 314 may be turned on. Switches 304, 312, and 316 may be turned off. Because switch 302 (SW1) is turned on, the power supply voltage ($V_{AAPIX}$) is provided to capacitor 322. Switch 306 (SW3) couples capacitor 322 to ground, so during the pre-charge phase capacitor 322 is coupled between $V_{AAPIX}$ and ground. Because switches 302 (SW1) and 308 (SW4) are connected, the power supply voltage from SW1 is provided to capacitor 324. Switch 314 (SW6) couples capacitor 324 (and BOOST_FDBK) to ground, so during the pre-charge phase capacitor 324 is coupled between $V_{AAPIX}$ and ground. Because switches 302 (SW1) and 310 (SW5) are connected, the power supply voltage from SW1 is provided to capacitor 326. Capacitor 326 is also coupled to ground, so during the pre-charge phase capacitor 326 is coupled between $V_{AAPIX}$ and ground. During the pre-charge phase, AMPOUT at node 338 is at ground and AGND_VREF_NODE at node 332 is at $V_{AAPIX}$.

Next, the boost phase may occur. During the boost phase, switches 302 (SW1), 306 (SW3), and 314 (SW6) may be opened, whereas switches 308 (SW4) and 310 (SW5) may remain closed. This causes the output (AMPOUT) of amplifier 318 to become equal to reference voltage $V_{REF}$. AGND_REF_NODE and $V_{BOOST}$ then become equal to the sum of $V_{REF}$ and $V_{AAPIX}$ (e.g., $V_{BOOST}=V_{REF}+V_{AAPIX}$). Therefore, when $V_{AAPIX}$ is 2.8V, for example, $V_{REF}$ can be controlled between 0V and 1.2V to result in $V_{BOOST}$ being between 2.8V and 4.0V.

In an alternate embodiment, during the pre-charge phase, SW4 is disconnected and SW4' is connected. This results in AGND_VREF_NODE being pre-charged to reference voltage $V_{REF\_FINE}$. $V_{BOOST}$ will then be equal to $V_{REF\_FINE}$ plus $V_{REF}$ after the boost phase. This allows booster circuitry 206 to output a voltage ($V_{BOOST}$) that is independent of the power supply voltage $V_{AAPIX}$ in the third mode.

Finally, consider operation of the booster circuitry in the second mode of operation, in which amplifier 318 (OTA1) and amplifier 320 (OTA2) are both enabled. In the second mode of operation, a pre-charge phase may first be completed. During the pre-charge phase, switches 304, 306, 308, 314, and 316 may be turned on. Switches 302, 312, and 310 may be turned off. Because switch 304 (SW2) is turned on, the output ($V_{BUFOUT}$) from amplifier 320 is provided to capacitor 322. Switch 306 (SW3) couples capacitor 322 to ground, so during the pre-charge phase capacitor 322 is coupled between $V_{BUFOUT}$ and ground. Because switches 304 (SW2) and 308 (SW4) are connected, $V_{BUFOUT}$ is provided to capacitor 324. Switch 314 (SW6) couples capacitor 324 (and BOOST_FDBK) to ground, so during the pre-charge phase capacitor 324 is coupled between $V_{BUFOUT}$ and ground. Because switch 316 (SW5') is connected, $V_{BUFOUT}$ is provided to capacitor 326. Capacitor 326 is also coupled to ground, so during the pre-charge phase capacitor 326 is coupled between $V_{BUFOUT}$ and ground. During the pre-charge phase, AMPOUT at node 338 is at ground (e.g., 0V) and AGND_VREF_NODE at node 332 is at $V_{BUFOUT}$. Because OTA2 is enabled, $V_{BUFOUT}$ is equal to $V_{REFBUF}$. $V_{REFBUF}$ (and therefore $V_{BUFOUT}$) may be set to 2.0V during the second mode, as an example.

Next, the boost phase may occur. During the boost phase, switch 316 (SW5') may be opened, whereas switches 306 (SW3), 314 (SW6), and 310 (SW5) may be closed. This causes the output (AMPOUT) of amplifier 318 to become equal to $V_{REF}$. AGND_REF_NODE and $V_{BOOST}$ then become equal to the addition of $V_{REF}$ and $V_{BUFOUT}$ (e.g., $V_{BOOST}=V_{REF}+V_{BUFOUT}$). Therefore, when $V_{BUFOUT}$ is 2.0V, for example, $V_{REF}$ can be controlled between 0V and 0.8V to result in $V_{BOOST}$ being output between 2.0V and 2.8V.

To summarize, the booster circuitry of FIG. 3 can support an output voltage range between 0V and 4.0V with a single circuit. The first mode may support an output voltage range between 0V and 2.0V, the second mode may support an output voltage range between 2.0V and 2.8V, and the third mode may support an output voltage range between 2.8V and 4.0V.

The switches shown in FIG. 3 may have any desired structure. For example, a switch that physically connects or disconnects two terminals may be used (e.g., a single-pole single-throw switch). Alternatively, a transistor formed in a semiconductor may be used to switch on or off the flow of signals in the circuit. These examples are merely illustrative, and each switch in the circuit may have any desired respective structure.

Figure 4:
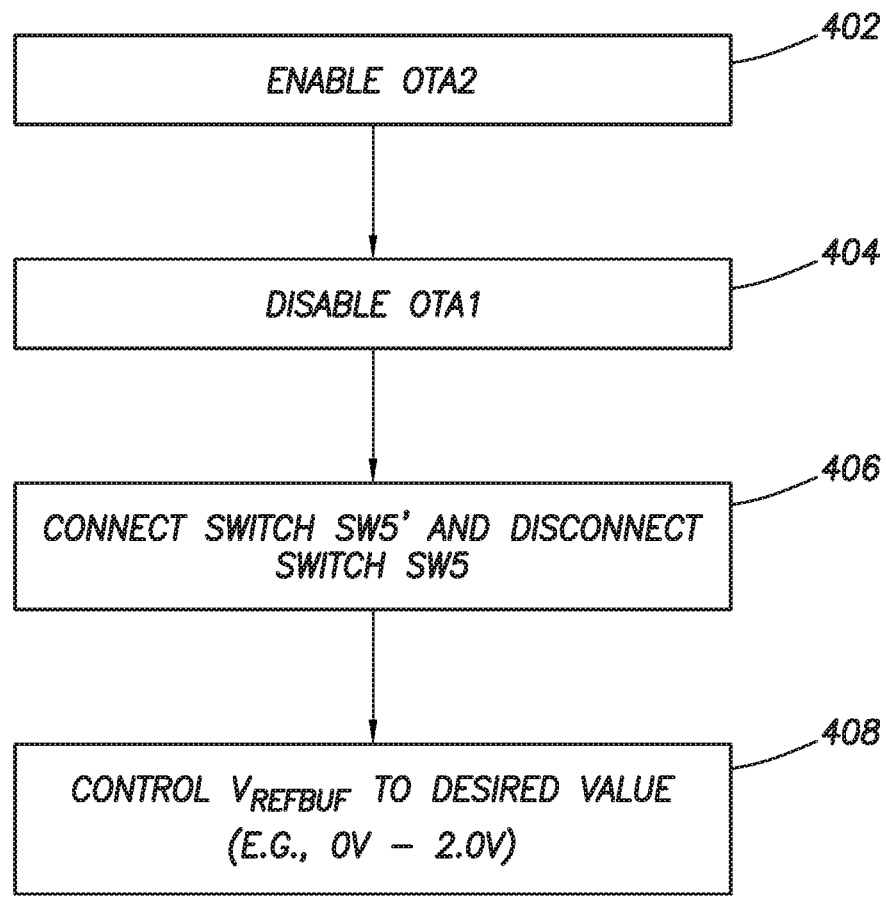
FIG. 4 is a diagram of illustrative method steps for operating booster circuitry of the type shown in FIG. 3 in a first operating mode in accordance with an embodiment of the present invention.

FIG. 4 is a diagram of illustrative method steps for operating booster circuitry 206 in the first mode. At step 402, amplifier 320 (OTA2) is enabled. At step 404, amplifier 318 (OTA1) is disabled. Next, at step 406, switch 316 (SW5') is connected and switch 310 (SW5) is disconnected. Finally, at step 408, the first input ($V_{REFBUF}$) to amplifier 320 is set to a desired value (e.g., between 0V and 2.0V). This results in $V_{BUFOUT}$ and $V_{BOOST}$ being equal to $V_{REFBUF}$.

Figure 5:
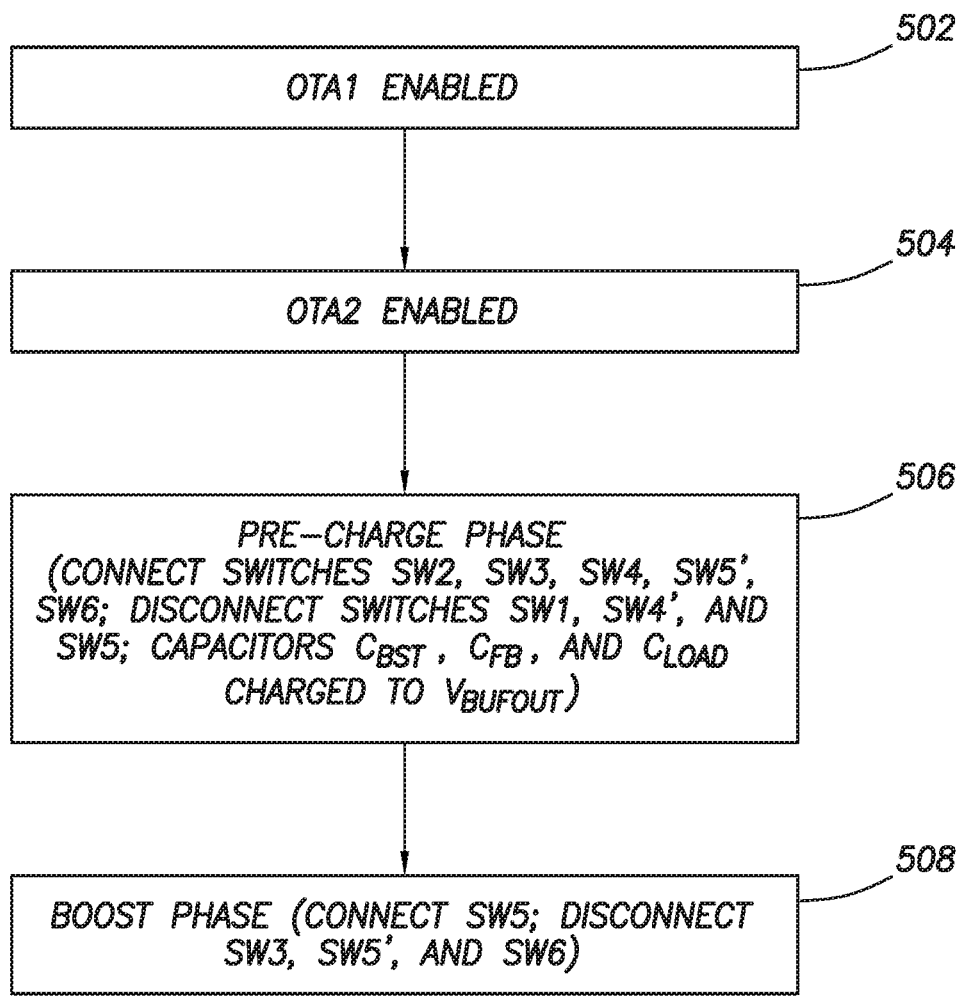
FIG. 5 is a diagram of illustrative method steps for operating booster circuitry of the type shown in FIG. 3 in a second operating mode in accordance with an embodiment of the present invention.

FIG. 5 is a diagram of illustrative method steps for operating booster circuitry 206 in the second mode. At step 502, amplifier 318 (OTA1) is enabled. At step 504, amplifier 320 (OTA2) is enabled. Next, at step 506, a pre-charge phase is performed. During the pre-charge phase, switches 304 (SW2), 306 (SW3), 308 (SW4), 316 (SW5'), and 314 (SW6) are connected, whereas switches 302 (SW1), 312 (SW4'), and 310 (SW5) are disconnected. This charges capacitors 322 ($C_{BST}$), 324 ($C_{FB}$), and 326 ($C_{LOAD}$) to $V_{BUFOUT}$ (which is equal to $V_{REFBUF}$). Then, after the pre-charge phase is complete, the boosting phase may be performed at step 508. During the boost phase, switch 310 (SW5) is connected whereas switches 306 (SW3), 314 (SW6), and 316 (SW5') are disconnected. This causes $V_{BOOST}$ to increase by an amount equal to $V_{REF}$. The total output voltage $V_{BOOST}$ is therefore equal to the $V_{BOOST}$ pre-charge amount ($V_{REFBUF}$) plus $V_{REF}$.

Figure 6:
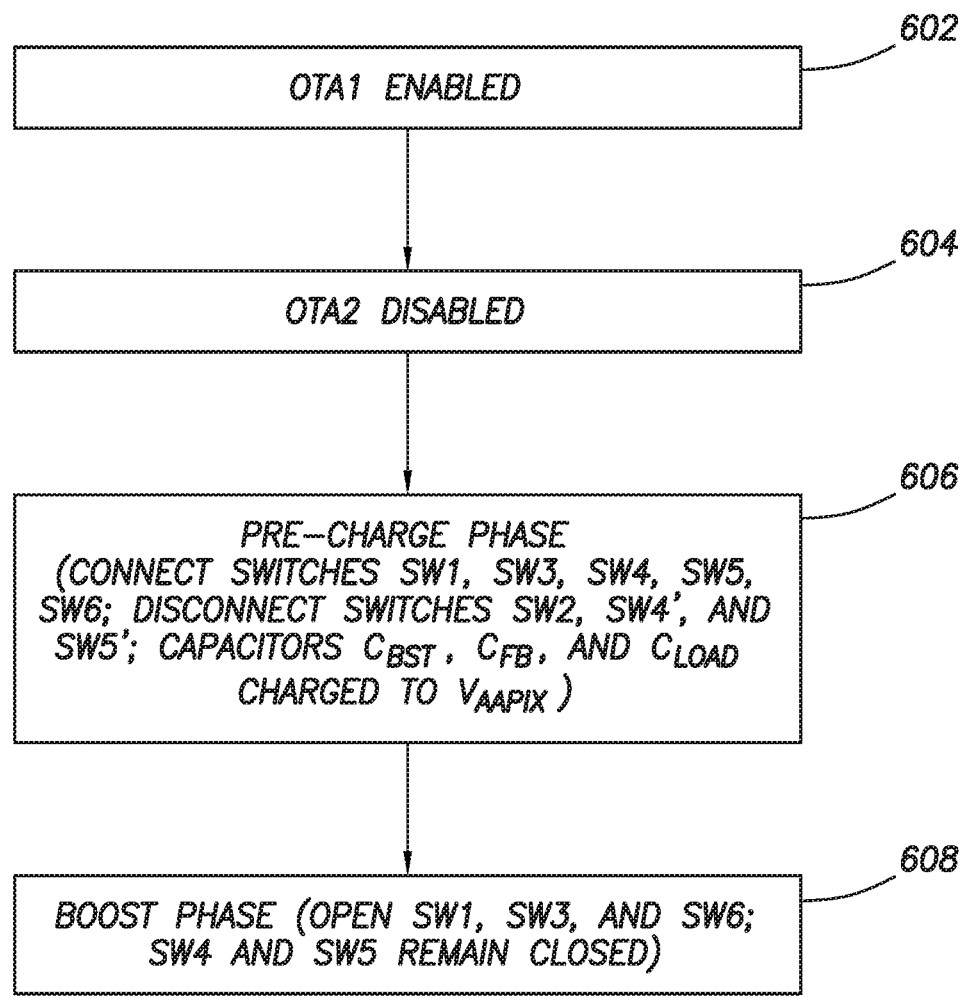
FIG. 6 is a diagram of illustrative method steps for operating booster circuitry of the type shown in FIG. 3 in a third operating mode in accordance with an embodiment of the present invention.

FIG. 6 is a diagram of illustrative method steps for operating booster circuitry 206 in the second mode. At step 602, amplifier 318 (OTA1) is enabled. At step 604, amplifier 320 (OTA2) is disabled. Next, at step 606, a pre-charge phase is performed. During the pre-charge phase, switches 302 (SW1), 306 (SW3), 308 (SW4), 310 (SW5), and 314 (SW6) are connected, whereas switches 304 (SW2), 312 (SW4'), and 316 (SW5') are disconnected. This charges capacitors 322 ($C_{BST}$), 324 ($C_{FB}$), and 326 ($C_{LOAD}$) to $V_{AAPIX}$. Then, after the pre-charge phase is complete, the boosting phase may be performed at step 608. During the boost phase, switches 310 (SW5) and 308 (SW4) remain connected whereas switches 306 (SW3), 314 (SW6), and 302 (SW1) are disconnected. This causes $V_{BOOST}$ to increase by an amount equal to $V_{REF}$. The total output voltage $V_{BOOST}$ is therefore equal to the $V_{BOOST}$ pre-charge amount ($V_{AAPIX}$) plus $V_{REF}$.

It should be noted that the order of steps shown in FIGS. 4-6 are merely illustrative. If desired, the order of certain steps (e.g., enabling/disabling OTA1/OTA2) may be switched or performed at different points in the method.

Figure 7:
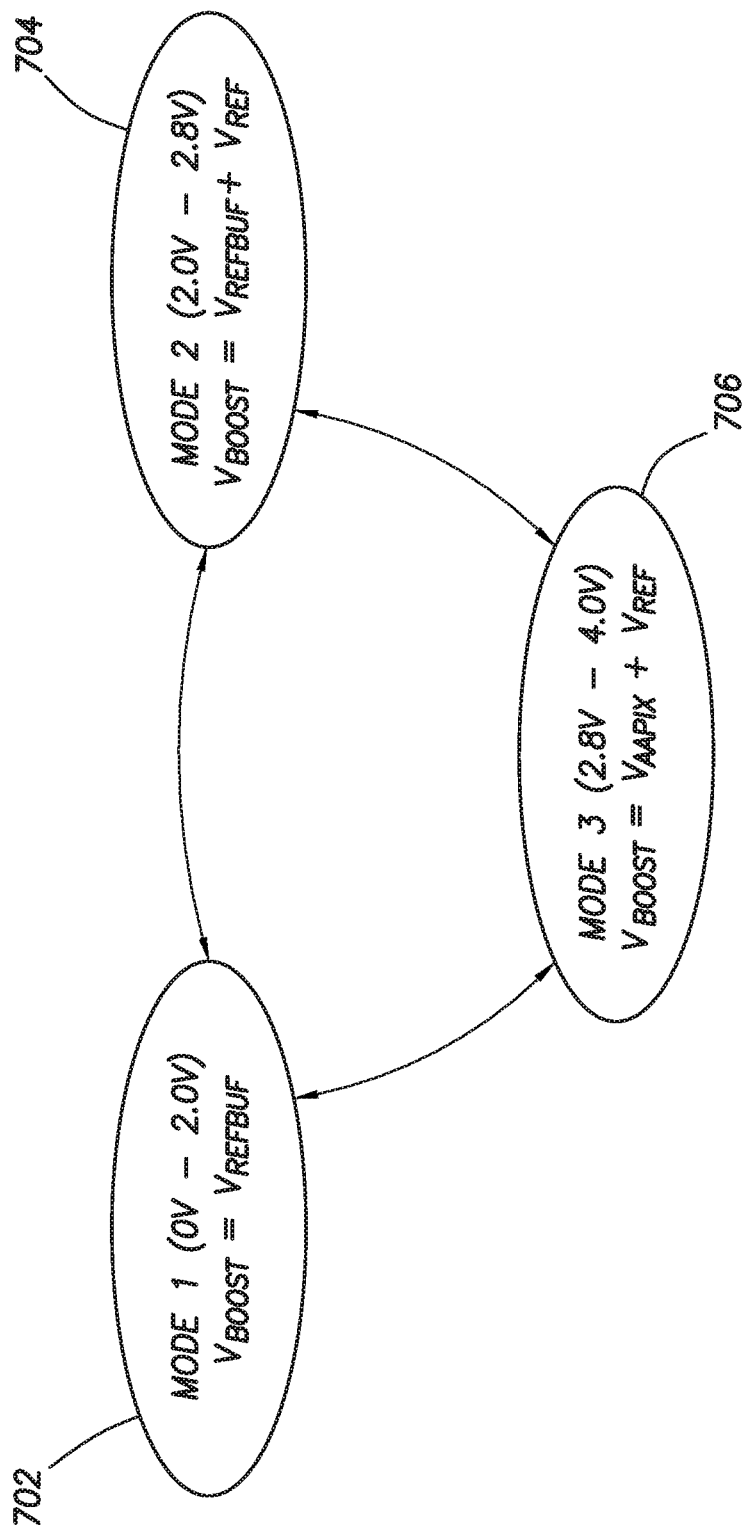
FIG. 7 is a state diagram showing illustrative operating modes for booster circuitry of the type shown in FIG. 3 in accordance with an embodiment of the present invention.

A state diagram showing illustrative operating modes for booster circuitry 206 is shown in FIG. 7. When operating in the first operating mode 702, booster circuitry may output a voltage between 0V and 2.0V. The booster circuitry may use OTA2 to output a voltage ($V_{BOOST}$) that is equal to $V_{REFBUF}$. When operating in the second operating mode 704, booster circuitry may output a voltage between 2.0V and 2.8V. The booster circuitry may use OTA1 and OTA2 to output a voltage ($V_{BOOST}$) that is equal to $V_{REFBUF}$ plus $V_{REF}$. $V_{REFBUF}$ and $V_{REF}$ may be independently controlled such that the total output $V_{BOOST}$ is a desired voltage between 2.0V and 2.8V. When operating in the third operating mode 706, booster circuitry may output a voltage between 2.8V and 4.0V. The booster circuitry may use OTA1 to output a voltage ($V_{BOOST}$) that is equal to $V_{AAPIX}$ plus $V_{REF}$. $V_{REF}$ may be controlled such that the total output $V_{BOOST}$ is a desired voltage between 2.8V and 4.0V. Booster circuitry 206 may switch between the first, second, and third operating modes based on the magnitude of the desired output voltage.

It should be noted that the examples for voltages included herein (e.g., $V_{AAPIX}$ being 2.8V, $V_{REFUB}$ being 2.0V, etc.) are merely illustrative. In general, each reference voltage and supply voltage described herein may be any desired voltage.

In various embodiments, an image sensor may include an array of imaging pixels and row control circuitry that includes booster circuitry. The booster circuitry may include a first amplifier with first and second inputs and a first output, a first switch interposed between the first output and an output node, a second amplifier with third and fourth inputs and a second output, a second switch interposed between the second output and the output node, and a third switch that is interposed between the second output and the first switch.

The booster circuitry may also include a fourth switch that is interposed between a power supply voltage and the first switch. A first reference voltage may be coupled to the first input of the first amplifier and a second reference voltage may be coupled to the third input of the second amplifier. The booster circuitry may be configured to operate in a first mode in which the second switch is closed, the first switch is open, and an output voltage at the output node is equal to the second reference voltage. The booster circuitry may be configured to operate in a second mode in which the output voltage is equal to a sum of the first reference voltage and the second reference voltage. The booster circuitry may be configured to operate in a third mode in which the first switch is closed, the second switch is open, and the output voltage at the output node is equal to a sum of the power supply voltage and the first reference voltage.

The first output of the first amplifier may be coupled to a first node and the booster circuitry may also include a fifth switch that is interposed between the first node and ground and a first capacitor that is interposed between the first node and the first switch. The booster circuitry may also include a second node that is coupled to the second input of the first amplifier, a sixth switch that is coupled between the second node and ground, and a second capacitor that is coupled to the second node. The booster circuitry may also include a seventh switch coupled between the second capacitor and the first switch. The second output of the second amplifier may be coupled to the fourth input of the second amplifier. The booster circuitry may also include a third node that is interposed between the second capacitor and the seventh switch and an eighth switch that is coupled between the third node and a third reference voltage.

In various embodiments, an image sensor may include an array of imaging pixels, column control and readout circuitry, and row control circuitry. The row control circuitry may include booster circuitry configured to output a voltage that is between a ground voltage and a first voltage that is higher than the ground voltage in a first mode, between the first voltage and a power supply voltage that is higher than the first voltage in a second mode, and between the power supply voltage and a second voltage that is higher than the power supply voltage in a third mode.

The booster circuitry may include first and second amplifiers. The second amplifier may be enabled in the first mode and the first amplifier may be disabled in the first mode. The first and second amplifiers may both be enabled in the second mode. The first amplifier may be enabled in the third mode and the second amplifier may be disabled in the third mode.

In various embodiments, a method of operating booster circuitry in an imaging sensor that includes a first amplifier with a first input that receives a first reference voltage, a second amplifier with a second input that receives a second reference voltage, a first switch that is interposed between the first amplifier and an output node, and a second switch that is interposed between the second amplifier and the output node may comprise pre-charging the output node to the second reference voltage while the second amplifier is enabled, the first switch is open, and the second switch is closed, and boosting the output node to a total output voltage that is equal to a sum of the first reference voltage and the second reference voltage while the first amplifier is enabled, the first switch is closed, and the second switch is open.

The booster circuitry may also include a third switch that is interposed between an output of the second amplifier and the first switch and pre-charging the output node to the second reference voltage may include pre-charging the output node to the second reference voltage while the third switch is closed. The first amplifier may have a second input, the booster circuitry may also include a capacitor that is interposed between the second input of the first amplifier and a fourth switch, the fourth switch may be interposed between capacitor and the first switch, and pre-charging the output node to the second reference voltage may include pre-charging the output node to the second reference voltage while the fourth switch is closed. The booster circuitry may include a fifth switch that is interposed between an output of the first amplifier and ground, pre-charging the output node to the second reference voltage may include pre-charging the output node to the second reference voltage while the fifth switch is closed, and boosting the output node to the total output voltage may include boosting the output node to the total output voltage while the fifth switch is open. The booster circuitry may include a sixth switch that is interposed between the second input of the first amplifier and ground, pre-charging the output node to the second reference voltage may include pre-charging the output node to the second reference voltage while the sixth switch is closed, and boosting the output node to the total output voltage may include boosting the output node to the total output voltage while the sixth switch is open.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor that includes an array of imaging pixels and row control circuitry, wherein the row control circuitry comprises booster circuitry and the booster circuitry comprises:
   a first amplifier with first and second inputs and a first output;
   a first switch interposed between the first output and an output node;
   a second amplifier with third and fourth inputs and a second output;
   a second switch interposed between the second output and the output node; and
   a third switch that is interposed between the second output and the first switch.

2. The image sensor defined in claim 1, wherein the booster circuitry further comprises:
   a fourth switch that is interposed between a power supply voltage and the first switch.

3. The image sensor defined in claim 2, wherein a first reference voltage is coupled to the first input of the first amplifier and wherein a second reference voltage is coupled to the third input of the second amplifier.

4. The image sensor defined in claim 3, wherein the booster circuitry is configured to operate in a first mode in which the second switch is closed, the first switch is open, and an output voltage at the output node is equal to the second reference voltage.

5. The image sensor defined in claim 4, wherein the booster circuitry is configured to operate in a second mode in which the output voltage is equal to a sum of the first reference voltage and the second reference voltage.

6. The image sensor defined in claim 5, wherein the booster circuitry is configured to operate in a third mode in which the first switch is closed, the second switch is open, and the output voltage at the output node is equal to a sum of the power supply voltage and the first reference voltage.

7. The image sensor defined in claim 3, wherein the first output of the first amplifier is coupled to a first node and wherein the booster circuitry further comprises:
   a fifth switch that is interposed between the first node and ground; and
   a first capacitor that is interposed between the first node and the first switch.

8. The image sensor defined in claim 7, wherein the booster circuitry further comprises:
   a second node that is coupled to the second input of the first amplifier;
   a sixth switch that is coupled between the second node and ground; and
   a second capacitor that is coupled to the second node.

9. The image sensor defined in claim 8, wherein the booster circuitry further comprises:
   a seventh switch coupled between the second capacitor and the first switch.

10. The image sensor defined in claim 9, wherein the second output of the second amplifier is coupled to the fourth input of the second amplifier.

11. The image sensor defined in claim 9, wherein the booster circuitry further comprises:
    a third node that is interposed between the second capacitor and the seventh switch; and
    an eighth switch that is coupled between the third node and a third reference voltage.

12. An image sensor comprising:
    an array of imaging pixels;
    column control and readout circuitry; and
    row control circuitry, wherein the row control circuitry comprises booster circuitry configured to output a voltage that is between a ground voltage and a first voltage that is higher than the ground voltage in a first mode, between the first voltage and a power supply voltage that is higher than the first voltage in a second mode, and between the power supply voltage and a second voltage that is higher than the power supply voltage in a third mode.

13. The image sensor defined in claim 12, wherein the booster circuitry comprises first and second amplifiers, wherein the second amplifier is enabled in the first mode and the first amplifier is disabled in the first mode.

14. The image sensor defined in claim 13, wherein the first and second amplifiers are both enabled in the second mode.

15. The image sensor defined in claim 14, wherein the first amplifier is enabled in the third mode and the second amplifier is disabled in the third mode.

* * * * *